United States Patent
Petri

[11] Patent Number: 4,857,628
[45] Date of Patent: Aug. 15, 1989

[54] BRANCHED POLYCARBONATE FROM 2,4,6-TRIS(4′-HYDROXYARYL)-AMINO-S-TRIAZINE

[75] Inventor: Alberto Petri, Milan, Italy

[73] Assignee: Enichem Tecnoresine, S.p.A., Palermo, Italy

[21] Appl. No.: 881,093

[22] Filed: Jul. 2, 1986

[30] Foreign Application Priority Data

Jul. 10, 1985 [IT] Italy .................. 21509 A/85

[51] Int. Cl.$^4$ ............................................. C08G 63/62
[52] U.S. Cl. ..................................... 528/203; 528/127;
528/171; 528/196; 528/204
[58] Field of Search ................. 544/197; 528/203, 204,
528/127, 171

[56] References Cited

U.S. PATENT DOCUMENTS

| | | | |
|---|---|---|---|
| 3,156,690 | 11/1964 | Dexter et al. | 544/197 |
| 3,255,191 | 6/1966 | Dexter et al. | 544/197 |
| 3,894,991 | 7/1975 | Neurray et al. | 528/203 |
| 4,297,492 | 10/1981 | Rasberger et al. | 544/197 |

Primary Examiner—Harold D. Anderson
Attorney, Agent, or Firm—Hedman, Gibson, Costigan & Hoare

[57] ABSTRACT

Branched, soluble, high-molecular-weight, thermoplastic polycarbonates having improved properties, and, in particular, suitable to the fabrication by blow-moulding, characterized by the presence in their structure of units deriving from the use in the synthesis of tris(4′-hydroxyaryl)-amino-S-triazines having the formula:

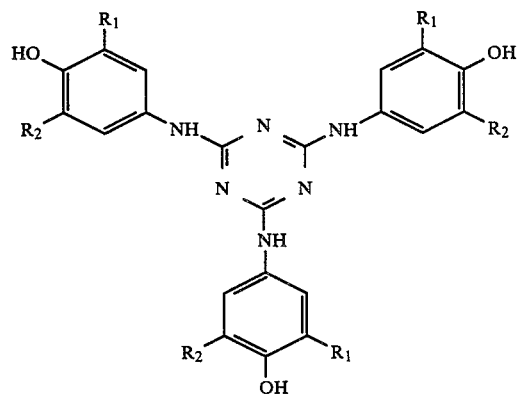

wherein $R_1$ and $R_2$, equal to, or different from each other, indicate hydrogen, linear or branched $C_{1-5}$ alkyl, or halogen (in particular, chlorine and bromine).

7 Claims, No Drawings

BRANCHED POLYCARBONATE FROM 2,4,6-TRIS(4'-HYDROXYARYL)-AMINO-S-TRIAZINE

Polycarbonates are thermoplastic materials which are widely used in several fields.

They are usually prepared by the reaction of a precursor of the carbonate group with a difunctional phenol, and have a linear structure.

Unlike most thermoplastic polymers, linear polycarbonate (PC) has an exclusively Newtonian behaviour, at least to the extent of not exhibiting excessively high values of time rate of strain; and its departures from such Newtonian behaviour, at high $\gamma$, are not so considerable as in other products.

The Newtonian behaviour occurs, it is known, whenever $\eta$ (apparent viscosity) is substantially independent from $\gamma$ (time rate of strain).

This rheological behaviour can represent a disadvantage when ductility is required in the product, requiring the product to be fabricated by different technologies.

Normally, linear PC is fabricated by injectionmoulding, while obtaining a high-quality product by extrusion, or blow-moulding procedures, which are techniques suitable to supply particular fabricated products (e.g. alveolar plates, bottles, hollow containers, and so forth) is not practical.

In blow-moulding and extrusion, it is in fact necessary that the fluid (molten) polymer have an apparent viscosity decreasing with increasing time rate of shear, is typical of non-Newtonian behaviour. This behaviour makes it possible to differentiate between the states of the molten polymer at two sequential times: at a first time, when the molten polymer is inside the fabrication machine (e.g., inside the extruder), and at a subsequent time, when the product is released from the fabrication machine (e.g., through the die of the same extruder).

During the first time, the time rates of strain the fluid is submitted to are high, and at the same time its apparent viscosity is low, resulting in easier processing of the polymer. Subsequently at the moment of the outlet of the polymer from the extruder, by contrast, low $\dot\gamma$'s and high viscosities prevail, preventing the product from collapsing and allowing the manufactured item to display good dimensional stability.

The non-Newtonian behaviour of the molten polymer has a considerable influence on two further properties: the elasticity of the molten polymer also (viz. the melt elasticity) and the melt strength, which also are very important from the viewpoint of the extrusion and blow-moulding techniques of fabrication.

The melt elasticity consists substantially in the capability of the non-Newtonian fluid of swelling, when emerging from the die, to a greater extent than a Newtonian fluid, as a consequence of a greater recovery of elastic energy in its interior, due to a greater distorsion and molecular orientation under the action of a shear stress.

The above results in an increase in product fabricability, due to a higher flexibility and ductility of the material.

The second property indicated, i.e., the melt strength, becomes significant at the moment at which the molten product comes out from the fabrication machine. It can be considered as the toughness of the polymer in the molten state, i.e., the capability shown by the molten polymer to stand the stress. If, indeed, the molten mass is not able to support its own weight, the extrudate collapses and, as a consequence obtaining the desired shapes of manufactured item is not possible.

From the above, it becomes clear that the polymers which have a non-Newtonian behaviour display two basic properties which allow them to be fabricated by extrusion and/or blow-moulding processes: high processability inside the fabrication machine (low apparent viscosity with high $\dot\gamma$'s and high melt elasticity) and very good performance when leaving the fabrication machine (high apparent viscosity with low $\dot\gamma$ and considerable melt tenacity).

Polycarbonates having rheological non-Newtonian properties can be easily prepared by the use of polyfunctional comonomers containing three or more reactive groups, so as to obtain a polymer structure characterized by the presence of random branching.

For example, in U.S. Pat. No. 2,950,266, the synthesis is disclosed of products of this type, carried out by using phloroglucinol as the polyfunctional comonomer.

According to the present invention, preparing branched polycarbonates characterized by excellent rheological properties which allow them to be fabricated by blow-moulding techniques is possible as well, by using, as the branching agents, 2,4,6-tris(4'-hydroxyaryl)-amino-S-triazines.

These compounds show the advantage of having a reactivity fully comparable to that of the aromatic dihydroxyderivatives, and they allow therefore considerably branched polycarbonates to be obtained, even if they are used in relatively minor amounts, and considerably lower amounts than those necessary in case of phloroglucinol.

SUMMARY OF THE INVENTION

An object of the present invention is accordingly to provide a method for the production of branched, soluble, high-molecular-weight polycarbonates, particularly suitable to be fabricated by blow-moulding.

Such a method consists of either the condensation by interfacial reaction or reaction in solution of aromatic dihydroxyderivatives, halogenated such dihydroxyderivatives or mixtures thereof, and phosgene, carbonate precursors of, or oligomers of polycarbonate containing chloroformyl groups, at temperatures of from 15° to 80° C., in the presence of an aromatic monohydroxy compound; or the transesterification between the same aromatic dihydroxyderivatives or halogenated such derivatives and alkyl, aryl or alkylaryl diesters of carbonic acid in the molten state, at temperatures of from 100° to 300° C.; said condensation or transesterification being carried out in the presence of 0.05–5 mol% (relative to the aromatic dihydroxyderivative) of a 2,4,6-tris(4'-hydroxyaryl)-amino-s-triazine, as the branching agents, corresponding to the following formula:

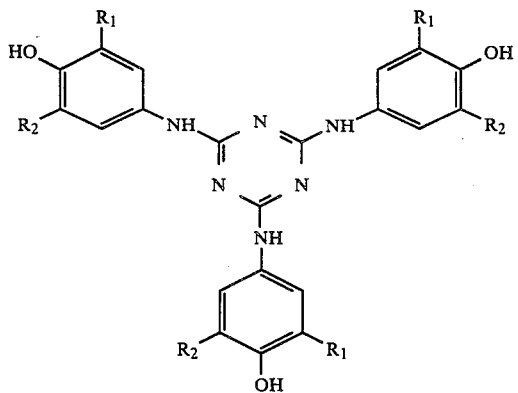

wherein $R_1$ and $R_2$, independently, indicate hydrogen, linear or branched $C_{1-5}$-alkyl, or halogen (in particular, chlorine and bromine).

Also the polycarbonates obtained according the method as herein disclosed are an object of the present invention.

DETAILED DESCRIPTION OF THE INVENTION 2,4,6-Tris(4-hydroxyaryl)-amino-s-triazines can be prepared, for example, by the reaction between cyanuryl chloride and aminophenols (and derivatives thereof) according to known processes, typical of the organic chemistry.

Examples of these compounds are:
2,4,6-tris(4'-hydroxyphenyl)-amino-s-triazine ($R_1=R_2=H$);
2,4,6-tris(3'-methyl-4'-hydroxyphenyl)-amino-s-triazine ($R_1=CH_3$, $R_2=H$);
2,4,6-tris(3',5'-dimethyl-4'-hydroxyphenyl)-amino-s-triazine ($R_1=R_2=CH_3$);
2,4,6-tris(3'-chloro-4'-hydroxyphenyl)-amino-s-triazine ($R_1=Cl$, $R_2=H$);
2,4,6-tris(3',5'-dichloro-4'-hydroxyphenyl)-amino-s-triazine ($R_1=R_2=Cl$);
2,4,6-tris(3'-bromo-4'-hydroxyphenyl)-amino-s-triazine ($R_1=Br$, $R_2=H$);
2,4,6-tris(3',5'-dibromo-4'-hydroxyphenyl)-amino-s-triazine ($R_1=R_2=Br$);
2,4,6-tris(3'-chloro-4'-methylphenyl)-amino-s-triazine ($R_1=Cl$, $R_2=CH_3$);
2,4,6-tris(3'-bromo-4'-hydroxy-5'-methylphenyl)-amino-s-triazine ($R_1=Br$, $R_2=CH_3$).

The aromatic dihydroxy compounds which can be used in the practice of the present invention are represented by the following formula:

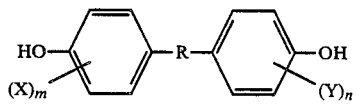

wherein R is the direct bond a substituted or unsubstituted alkylene group containing from 1 to 5 carbon atoms, —O—, —S—, —SO$_2$, —CO—;
X and Y are the same or different from each other, and are selected from H, CH$_3$ or halogens, m and n are integers, independently ranging from 1 to 4.

Typical examples of such compounds are:
4,4'-dihydroxy diphenyl;
2,2-bis-(4-hydroxyphenyl)-propane (bisphenol A);
2,2-bis-(4-hydroxyphenyl)-methane;
2,2-bis-(3,5-dichloro-4-hydroxyphenyl)-propane;
2,2-bis-(3,5-dimethyl-4-hydroxyphenyl)-propane; and so forth.

Divalent compounds with one aromatic ring only, such as resorcinol, hydroquinone and pyrocatechol, as well as mixtures of all the compounds mentioned can be used as well.

For the purpose of regulating the molecular weight of the resulting polycarbonate, such aromatic monohydroxy compounds as, for example, phenol, p-isopropylphenol, p-tert.butylphenol, etc., can be used.

The branched polycarbonates of the present invention can be prepared according to one of the polycondensation methods reported in the prior art.

For example, the polyfunctional comonomer (branching agent), together with dihydroxyaryl derivative, is dissolved in an aqueous solution of sodium hydroxide, and to such a mixture an organic solvent immiscible with water, such as, e.g., dichloromethane, is added.

Through the mixture, gaseous phosgene is bubbled in the presence of a regulator of molecular weight, (e.g., a monofunctional phenol) and phase transfer catalyst, (e.g., a tertiary amine). The reaction mixture is maintained at a temperature of from 15° to 25° C. for a time ranging from 1 to 6 hours.

The branched polycarbonate so obtained is isolated, with high yields, after washing of the organic phase, by known techniques and distillation of the solvent, or precipitation by a non-solvent.

An alternative route for carrying out the method consists in first preparing chloroformyl-terminated oligomers of polycarbonates, by interfacial reaction between phosgene and the dihydroxyaryl compounds dissolved in aqueous-alkaline solution, in the presence of an organic solvent. The average molecular weight of the oligomers, preferably within the range of from 400 to 2000, can be determined a priori by the use of monofunctional phenols.

After the separation of the two phases, the organic solution containing the chloroformyl-terminated oligomers is submitted to interfacial condensation in the presence of the branching agent. The branched polycarbonate obtained is purified as indicated hereinabove.

Introducing into the aqueous phase such reducing agents as, for example, sodium hyposulphite is recommended, for the purpose of preventing the formation of coloured byproducts.

A further possibility of achieving the branched polycarbonates consists of resorting to the known methodology of polycondensation in solution: in this case, phosgene is bubbled through a solution of methylene chloride and pyridine containing the molecular weight regulator (monofunctional phenol), the dihydroxyaryl derivative and the polyfunctional compound (the branching agent of the present invention). The polycarbonate so obtained is then directly isolated, with high yields, by distillation of the solvent, or by precipitation by a non-solvent.

The mixture of diphenolic and triphenolic compounds (branching agents) can be converted into a high-molecular-weight branched polycarbonate also by the method of transesterification in the molten state, by reaction with dialkyl-, diaryl- or alkylaryl carbonates, at temperatures comprised of from 100° to 300° C., and in the presence of transesterification catalysts such as alkali metals and their oxides, alkoxides of transition metals, or the like.

In this case, the polymerization degree is controlled not by the presence of regulators of molecular weight, but by the efficiency of the removal of the byproducts and by the stirring of the molten mass.

The high-molecular-weight branched polycarbonates obtained, according to the scope of the present invention, by any of the methods as disclosed, are characterized by their complete solubility in the usual linear polycarbonate solvents and by a strong interdependence between the melt viscosity and the time rate of strain.

In fact, the shear sensitivity, which is the ratio of the flow rates of the molten polymer at two different values of shear stresses and, hence, an indirect measurement of the non-Newtonian behaviour of the polymer, has values always higher than 15, the linear polycarbonate has values around 12–13.

The polycarbonates prepared according to the present invention are suitable to be fabricated both by extrusion and injection-moulding processes.

Furthermore, due to the effect of the excellent dimensional stability of the molten mass, they can be processed also by the blow-moulding method for the production of hollow bodies. Finally, due to their rheological characteristics, the branched polycarbonates of the invention are useful to make extruded sheets having good mechanical properties and with higher resistance to stresses.

For the characterization of the branched polycarbonates prepared according to the present invention, the following procedures have been used:

Intrinsic Viscosity. It is measured in methylene chloride at 20° C. by the Ubbelhode viscometer, and is expressed as dl/g;

Shear Sensitivity. The evaluation is carried out on the "melt indexer" under loads of from 2.16 to 21.6 kg at 260° C., according to ASTM D 1238 Test;

Impact Strength (IZOD). This characteristic is evaluated on notched bars at 0° C., according to ASTM D 256.

A further object of the present invention are 2,4,6-tris(4'-hydroxyaryl)-amino-s-triazines having the general formula (I)

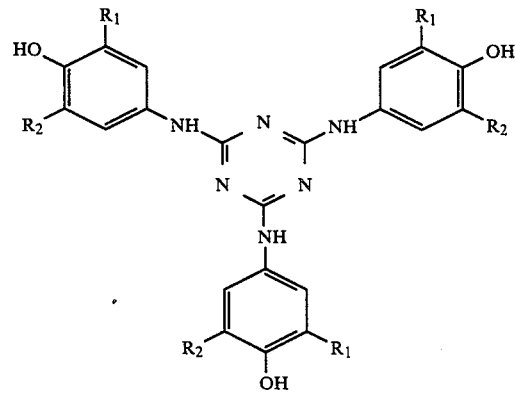

wherein $R_1$ and $R_2$, equal to, or different from each other, indicate hydrogen, linear or branched alkyl radical containing from 1 to 5 carbon atoms, or halogen.

The present invention is disclosed in detail in the following Examples, which are not intended to limit the scope of the invention in any way.

EXAMPLE 1

Preparation of 2,4,6-tris(4'-hydroxyphenyl)-amino-s-triazine

To a solution of 62.1 g (570 mmol) of p-aminophenol in 550 ml of acetone, 150 ml of the same solvent, containing 17.5 g (95 mmol) of cyanuryl chloride is added dropwise over a 1-hour period. The reaction mixture is kept boiling (at about 56° C.) for a further three hours.

36.8 g of product, 2,4,6-tris-(4'-hydroxyphenyl)-amino-s-triazine, is then obtained by precipitation with water and subsequent washings with the same non-solvent (yield=96.3%).

Elemental Analysis: C=62.7; H=4.6; N=20.8. ($C_{21}H_{18}N_6O_3$ requires: C=62.7; H=4.5; N=20.9)

The values of equivalent weight (titration of aromatic hydroxy groups), molecular weight (V.P.O. and M5) and the molecular structure (N.M.R.) are in compliance with the proposed formula.

The compound melts at 301° C. (D.S.C.).

The other derivatives of the class of 2,4,6-tris(4-hydroxyaryl)-amino-s-triazine are prepared by procedures analogous to those as described above.

EXAMPLE 2

Into a 3-l glass reactor, kept at the controlled temperature of 25° C., 84 g of bisphenol A, 370 mg of 2,4,6-tris(4'-hydroxyphenyl)-amino-s-triazine (0.25% by mol relative to bisphenol), 65.2 g of sodium hydroxide dissolved in 650 ml of water, 20 mg of sodium hyposulphite (as the reducing agent) and 6.3 ml of an aqueous solution of 0.5N triethylamine are charged under nitrogen.

Then, 2.7 g of p-tert.butylphenol dissolved in 1300 ml of methylene chloride is added and into the mixture, kept under vigorous stirring, 44 g of gaseous phosgene is bubbled over 30 minutes.

The reaction is continued 2 hours, with aqueous sodium hydroxide (at 20% by weight) being added as needed to maintain the pH value above 11.

At the end of this period, the reaction mass is diluted with 500 ml of methylene chloride, and the organic phase is separated and subsequently washed with 300 ml of water (twice), 800 ml of 0.15N aqueous sodium hydroxide (3 times), 600 ml of water (twice), 800 ml of 0.1N hydrochloric acid, and finally with portions of 600 ml of water up to neutrality.

The polymer is recovered by distillation of the organic solvent, is dried and milled to obtain a powder.

The branched polycarbonate has the following characteristics:
intrinsic viscosity=0.521 dl/g;
shear sensitivity=22.3
IZOD impact strength=829 J/m.

EXAMPLE 3

212 g of chloroformyl-terminated polycarbonate oligomers (numerical molecular weight=590, chloroformyl terminal groups=2780 meq/kg, terminal hydroxy groups=490 meq/kg), prepared from bisphenol A, phosgene and p-tert.butylphenol and dissolved in 900 ml of methylene chloride, are charged, under nitrogen, into a 2.5-l glass reactor kept at the controlled temperature of 25° C.

Under mechanical stirring by a magnetic-anchor stirrer (300 rpm), 50 ml of water containing 720 mg of 2,4,6-tris(4'-hydroxyphenyl)-amino-s-triazine (0.2% by mol relative to total bisphenol A), 4.5 of NaOH and 31 mg of sodium hyposulphite and 5 ml of 0.05N aqueous solution of triethylamine are then added in the order as listed.

Thereafter, 97 ml of an aqueous solution of NaOH at 20% (by weight) is then added over a 10-minutes period, by using a metering pump, and, 30 minutes later, 300 ml of water containing 48.1 g of bisphenol A and 17 g of NaOH are then added.

Three hours later, the mixture is poured into 2200 ml of methylene chloride. The organic phase is then separated and washed, consecutively, with 450 ml of water (twice), 1300 ml of 0.15N aqueous sodium hydroxide (3 times), 900 ml of water (twice), 1300 ml of 0.1N hydrochloric acid and, finally, with 900 ml portions of water up to neutral pH.

The branched polycarbonate, isolated by the usual methodology, has the following characteristics:
intrinsic viscosity = 0.483 dl/g;
shear sensitivity = 16.0
IZOD impact strength = 821 J/m.

EXAMPLE 4

Example 3 is repeated with the same operating procedures and amounts of reactants, with the exception that 1.45 g of 2,4,6-tris(4'-hydroxyphenyl)-amino-s-triazine (0.4% by mol relative to total bisphenol A) is used.

The branched polycarbonate obtained has the following characteristics:
intrinsic viscosity = 0.599 dl/g;
shear sensitivity = 21.4
IZOD impact strength = 826 J/m.

EXAMPLE 5

Example 3 is repeated with the same operating procedures and amounts of reactants, with the exception that 2.90 g of 2,4,6-tris(4'-hydroxyphenyl)-amino-s-triazine (0.8% by mol relatively to total bisphenol A) is used.

The branched polycarbonate obtained has the following characteristics:
intrinsic viscosity = 0.510 dl/g;
shear sensitivity = 22.9
IZOD impact strength = 828 J/m.

I claim:

1. A blow moldable, branched polycarbonate obtained by a process comprising the polymerization reaction of at least one (a) tris(4'-hydroxyaryl)amino-s-triazine having the formula (I)

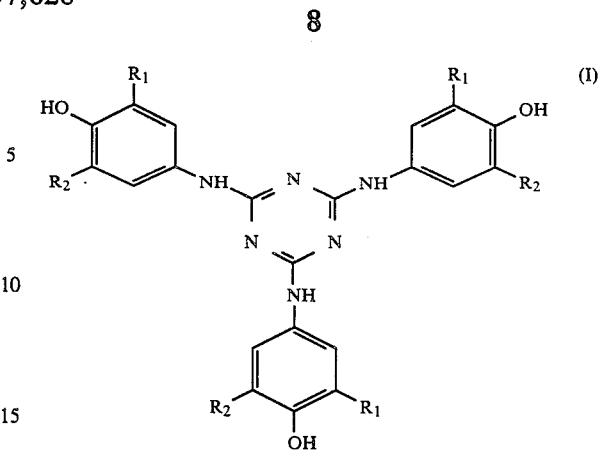

wherein $R_1$ and $R_2$ are independently selected from the group consisting of hydrogen, a linear alkyl group or branched alkyl group having 1 to 5 carbon atoms, or halogen;

(b) an aromatic dihydroxy compound having the formula (II)

$$HO-\underset{X_m}{\bigcirc}-R-\underset{Y_n}{\bigcirc}-OH \qquad (II)$$

wherein R is selected from a direct bond, or R represents a substituted or unsubstituted alkylene group having 1 to 5 carbon atoms, —O—, —S—, $SO_2$—, or —CO—; X and Y are independently selected from hydrogen, methyl, or halogen; m and n are, independently, integers from 1 to 4; and (c) a carbonate precursor.

2. The blow moldable branched polycarbonate of claim 1 wherein the carbonate precursor is phosgene.

3. The blow moldable branched polycarbonate of claim 1 wherein the carbonate precursor is an oligomer of a carbonate and contains a chloroformyl group prepared by the interfacial reaction of phosgene and a dihydroxaryl compound.

4. The blow moldable branched polycarbonate of claim 1 wherein the triazine compound of formula I is present in an amount of from 0.05 to 5 mol % relative to the aromatic dihydroxy compound.

5. The blow moldable branched polycarbonate of claim 1 wherein the triazine compound of formula I is selected from the group consisting of 2,4,6-tris(4'-hydroxyphenyl)-amino-s-triazine; 2,4,6-tris(3'-methyl-4'-hydroxyphenyl)-amino-s-triazine; 2,4,6-tris(3',5'-dimethyl-4'-hydroxyphenyl)-amino-s-triazine; 2,4,6-tris(3'-chloro-4-'-hydroxyphenyl)-amino-s-triazine; 2,4,6-tris(3',5'-dichloro-4'-hydroxyphenyl)-amino-s-triazine; 2,4,6-tris(3'-bromo-4'-hydroxyphenyl)-amino-s-triazine; 2,4,6-tris(3',5'-dibromo-4'-hydroxyphenyl)-amino-s-triazine; 2,4,6-tris(3'-chloro-4'-methylphenyl)-amino-s-triazine; and 2,4,6-tris(3'bromo-4'-hydroxy-5'-methylphenyl)-amino-s-triazine.

6. The blow moldable branched polycarbonate of claim 1 wherein said process includes the step of reacting an unsubstituted aromatic dihydroxy compound or a halogen substituted aromatic dihydroxy compound or mixture thereof and the carbonate precursor at a temperature of from 15° to 80° C. in the presence of an aromatic monohydroxy compound.

7. The blow moldable branched polycarbonate of claim 1 wherein said process includes the step of reacting by transesterification an unsubstituted aromatic dihydroxy compound or a halogen substituted aromatic dihydroxy compound or mixture thereof and an alkyl, aryl or alkylaryl diester of carbonic acid at a temperature of from 100° to 300° C.

* * * * *